(12) United States Patent
Park et al.

(10) Patent No.: US 7,826,073 B2
(45) Date of Patent: Nov. 2, 2010

(54) METHOD OF MANAGING SETTINGS OF PROPERTIES OF AN IMAGE FORMING DEVICE

(75) Inventors: Dong-chae Park, Suwon-si (KR); Joo-young Jung, Yongin-si (KR)

(73) Assignee: Samsung Electronics Co., Ltd, Suwon-si, Gyeonggi-do ( * ) Notice: Subject to any disclaimer, the term of this patent is extended or adjusted under 35 U.S.C. 154(b) by 1351 days.

(21) Appl. No.: 11/032,013

(22) Filed: Jan. 11, 2005

(65) Prior Publication Data

US 2005/0162669 A1 Jul. 28, 2005

(30) Foreign Application Priority Data

Jan. 27, 2004 (KR) .................. 10-2004-0005188

(51) Int. Cl.
*G06K 15/00* (2006.01)

(52) U.S. Cl. ...................................... 358/1.1; 358/1.13

(58) Field of Classification Search .................. 347/129, 347/112, 111; 358/474, 471, 400, 1, 1.1, 358/1.12, 1.16, 1.17, 1.13
See application file for complete search history.

(56) References Cited

U.S. PATENT DOCUMENTS

| 5,890,163 | A | * | 3/1999 | Todd | ........................... 707/200 |
| 5,982,367 | A | | 11/1999 | Alimpich et al. | |
| 6,014,658 | A | * | 1/2000 | Pretz | ............................. 707/2 |
| 7,057,747 | B1 | * | 6/2006 | Minagawa | .................. 358/1.13 |
| 7,167,858 | B2 | * | 1/2007 | Naeymi-Rad et al. | .......... 707/6 |
| 2002/0035941 | A1 | | 3/2002 | Nakao | |
| 2002/0131086 | A1 | * | 9/2002 | Mori et al. | .................. 358/1.18 |
| 2003/0056179 | A1 | * | 3/2003 | Mori | .......................... 715/530 |
| 2003/0112456 | A1 | * | 6/2003 | Tomita et al. | ............... 358/1.13 |
| 2004/0204957 | A1 | * | 10/2004 | Afeyan et al. | ................... 705/1 |
| 2006/0114509 | A1 | * | 6/2006 | Itaki et al. | ................... 358/1.15 |

FOREIGN PATENT DOCUMENTS

| EP | 0933693 A2 | 1/1999 |
| JP | 2000-222159 | 8/2000 |
| JP | 2002-321432 | 11/2002 |

* cited by examiner

*Primary Examiner*—Gabriel I Garcia
(74) *Attorney, Agent, or Firm*—Stanzione & Kim, LLP

(57) ABSTRACT

A method of managing settings of properties of an image forming device includes receiving a first selection of properties from a user to create a set of properties of the image forming device, assigning a name of a user setting group to represent the set of properties and storing the user setting group having the assigned name, receiving a second selection of properties from the user, comparing the second selection of properties to the set of properties of the stored user setting group having the assigned name, and associating the assigned name of the stored user setting group with a user setting group having the second selection of properties when the set of properties is identical to the second selection of properties. Therefore, the method of managing settings of properties can effectively manage settings of properties of the image forming device to prevent creation of unnecessary user setting groups.

12 Claims, 4 Drawing Sheets

METHOD OF MANAGING SETTINGS OF PROPERTIES OF AN IMAGE FORMING DEVICE

CROSS-REFERENCE TO RELATED APPLICATIONS

This application claims the benefit of Korean Patent Application No. 2004-5188, filed on Jan. 27, 2004, in the Korean Intellectual Property Office, the disclosure of which is incorporated herein in its entirety by reference.

BACKGROUND OF THE INVENTION

1. Field of the Invention

The present general inventive concept relates to a method of setting properties of an image forming device, and more particularly, to a method of managing the settings of properties of the image forming device.

2. Description of the Related Art

Generally, a driver is installed on a host computer connected to an image forming device to control the image forming device. The driver is typically a software program that extends an operating system of the host computer to support a device, such as a printer, and/or enables an application to use the device. The image forming device is an electronic device that prints images on a recoding medium, such as paper. Image forming devices include printers, faxes, scanners, and multifunctional devices having functions for printing and scanning.

A user sets various properties of the image forming device, such as printing preferences, using the driver installed on the host computer. In an example relating to a laser printer, the user controls printing preferences including a printing quality, a paper size, an orientation, a selection of tray, or usage of watermark using the driver. Properties of the laser printer are previously set for general use to a default setting when the laser printer is first produced by a manufacturer. However, various settings of the properties of the laser printer are needed to satisfy the user's use requirements of the laser printer. Accordingly, the laser printer provides various ways for changing the properties and storing the changed properties of the laser printer. After the user changes the printing preferences, the setting of the changed printing preferences is stored with a unique setting name. The user can easily restore the changed printing preferences by recalling the stored unique setting name. For example, when the user prepares a letter to send to the United State of America, the user changes the paper size to a letter size and sets the orientation as a portrait. After changing the printing preferences of the laser printer, the user stores the changed printing preferences as "letter output." Whenever the user recalls "letter output" setting using the driver, the driver automatically sets the paper size to the letter size and the orientation to the portrait.

FIG. 1 is a view of a conventional user interface of a driver for an image forming device to illustrate a conventional method for setting properties of a laser printer.

As illustrated in FIG. 1, the conventional user interface includes a user setting group selection menu 1 for selecting one of stored user setting groups, a managing button 2 for managing a selected user setting group, and a printing preference selection menu 3 for changing printing preferences of the laser printer.

When a user installs the driver of the laser printer on a host computer connected to the laser printer, "default setting" is displayed on the user setting group selection menu 1. In the default setting, a paper size is set to "A4" and a type of paper is set to "normal paper." The default setting is provided by a manufacturer of the laser printer by considering general uses of the laser printer. When the user wants to change the paper size to a letter size, the user selects "LETTER" from among paper size options provided in the printing preference selection menu 3 and the changed paper size is then confirmed by clicking the managing button 2. When the user alternately uses two paper sizes "A4" and "LETTER," the user must load the driver to display the user interface of the laser printer for changing the paper size in order to use the printing preference selection menu 3 in the user interface. This is an inconvenient process.

Accordingly, the manufacturer of the image forming device generally provides an option for storing a setting of the printing preferences. That is, after changing the printing preferences, the user can register a user setting group including the changed printing preferences with a unique setting name by clicking the managing button 2. After registering, the user can restore the changed printing preference by selecting the user setting group with the unique setting name in order to reduce time it takes to change the printing preferences. Additionally, registered user setting groups provided in the user setting group selection menu 1 can be deleted and a newly created user setting group can be added by clicking the managing button 2. The managing button 2 is programmed to provide functions of adding and deleting user setting groups according to a state of the user setting group selection menu 1. For example, when the user selects one of the registered user setting groups in the user setting group selection menu 1, the managing button 2 performs the deleting function and "deleting" is displayed on the managing button 2.

The above mentioned conventional method for setting the properties of the image forming device allows duplicate user setting groups to be created. This is redundant and may confuse the user.

For example, when the user changes the paper size to "LETTER," "unregistered" is displayed on the user setting group selection menu 1. This occurs, because the driver clears a previous setting of the properties of the laser printer and assumes that the user wants to register an additional user setting group including new printing preferences. After changing the paper size to "LETTER," the managing button is changed to perform the adding function and "adding" is instantly displayed on the managing button 2. If the user clicks the managing button 2, a dialog box is displayed for entering a unique setting name of the additional user setting group with the new printing preferences. If the user enters "LETTER OUTPUT" as the unique setting name of the additional user setting group, the LETTER OUTPUT user setting group is stored by the driver.

The user can continue to use the default setting again for preparing a document in A4 paper size after storing the LETTER OUTPUT user setting group. If the user changes the paper size to "LETTER" and the orientation to portrait by using the printing preference selection menu 3 and then the managing button 2 is clicked, the driver displays the dialog box for entering a name of an additional user setting group with currently set printing preferences. By entering the name, the function of the managing button 2 is changed to the adding function and "adding" is displayed on the managing button 2. Accordingly, the user must register the additional user setting group. That is, the additional user setting group may be set to have identical printing preferences as the LETTER OUTPUT user setting group. Therefore, this duplicates existing user setting groups and may cause the user to have difficulties when attempting to select a user setting group with desired printing preferences. Additionally, the user must register unwanted user setting groups, because the function of the managing button 2 unexpectedly changes to perform the adding function or the deleting function according to changes of the printing preference.

SUMMARY OF THE INVENTION

The present general inventive concept provides a method of effectively managing settings of properties of an image forming device by comparing currently selected printing preferences to printing preferences of registered user setting groups and displaying a registered user setting group having identical printing preferences.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of managing settings of properties of an image forming device, the method including receiving a first selection of properties from a user to create a set of properties of the image forming device, assigning a name of a user setting group to represent the set of properties and storing the user setting group having the set of properties with the assigned name, receiving a second selection of properties from the user, comparing the second selection of properties with the set of properties of the stored user setting group having the assigned name, and associating the assigned name of the stored user setting group with a user setting group having the second selection of properties when the set of properties is identical to the second selection of properties.

The operation of comparing the second selection of properties with the set of properties of the stored user setting group may include comparing the second selection of properties to the set of properties of the stored user setting group and preventing creation of an additional user setting group when the second selection of properties is identical to the set of properties of the stored user setting.

The operation of comparing the second selection of properties with the set of properties of the stored user setting group may further include enabling creation of an additional user setting group when the second selection of properties is different from the set of properties of the stored user setting group.

The operation of comparing the second selection of properties with the set of properties of the stored user setting group may be performed by a driver of the image forming device.

The first selection of properties may set printing preferences of the image forming device.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
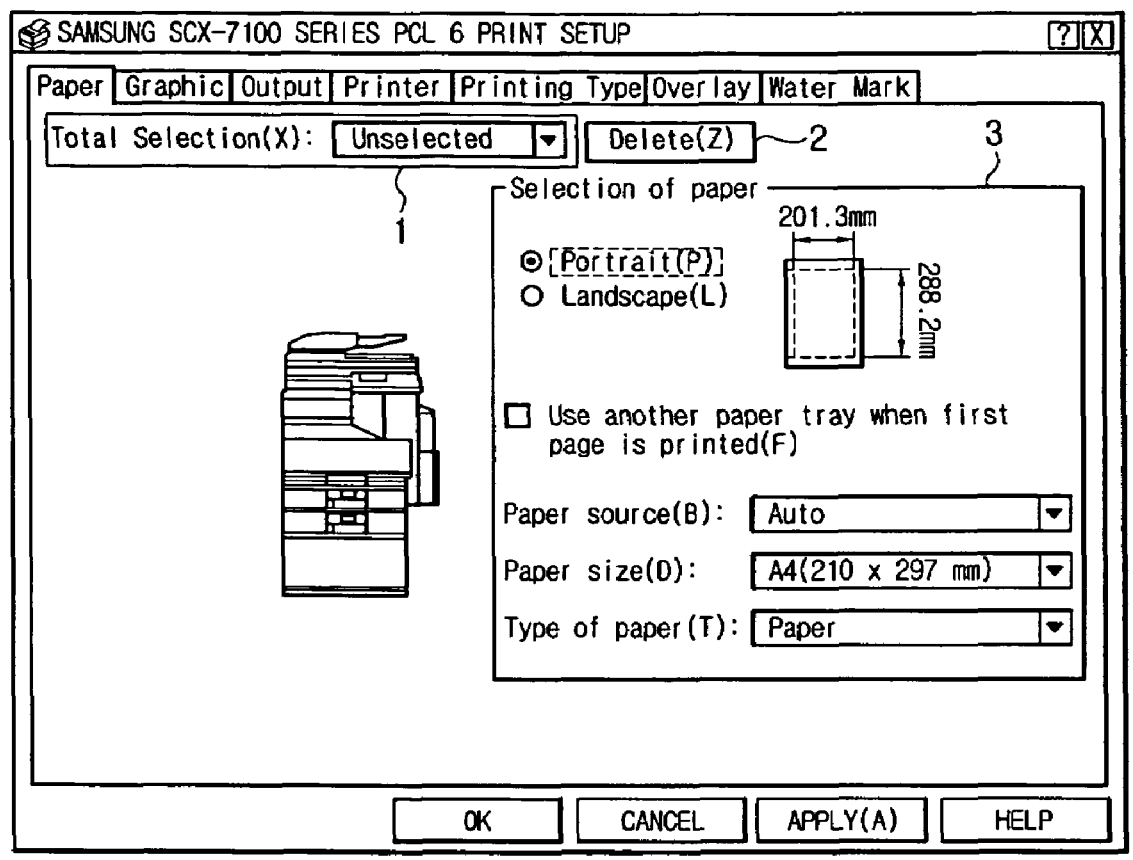
FIG. 1 is a view of a user interface illustrating a conventional method for setting properties of an image forming device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2A:
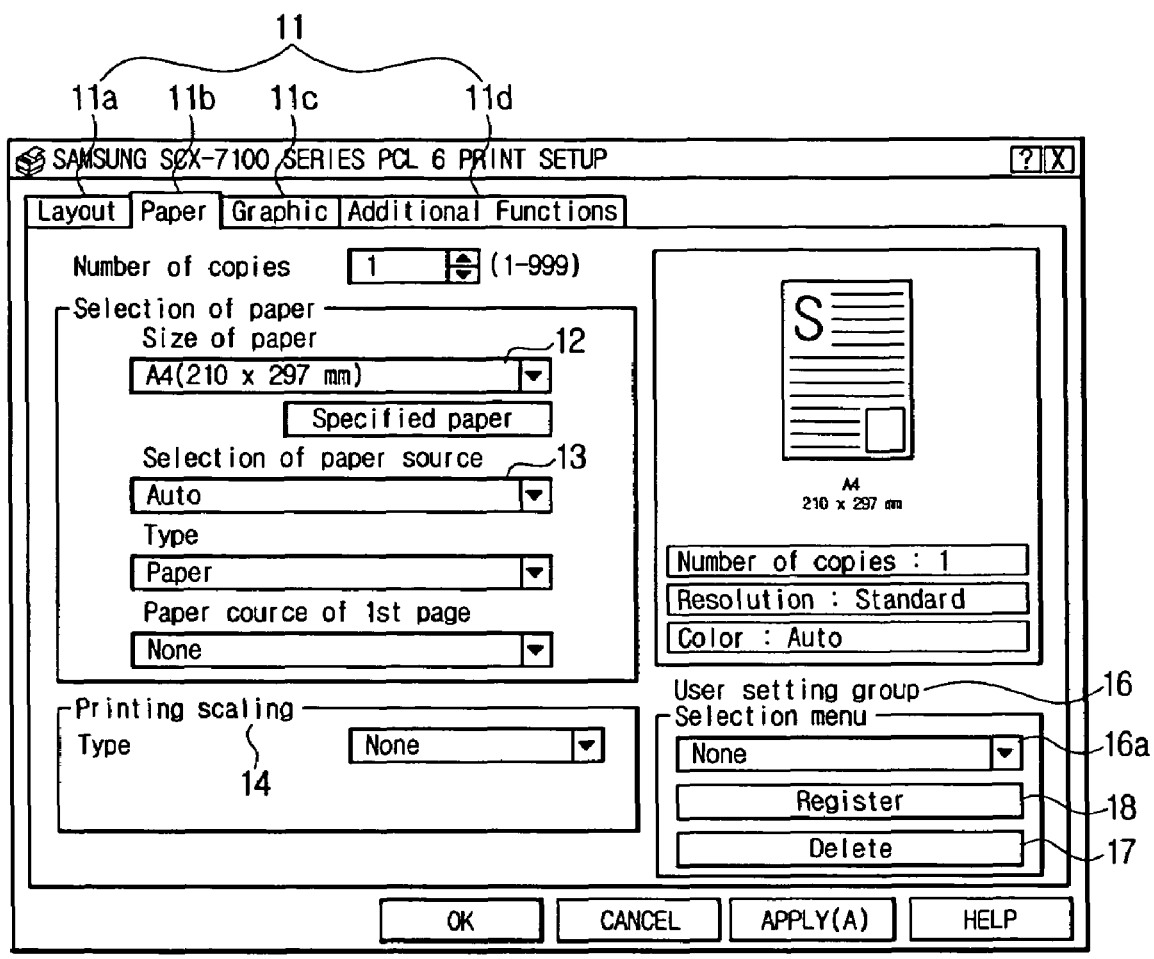
FIGS. 2A and 2B are views of user interfaces to illustrate a method of managing settings of properties of an image forming device according to an embodiment of the present general inventive concept.
Figure 2B:
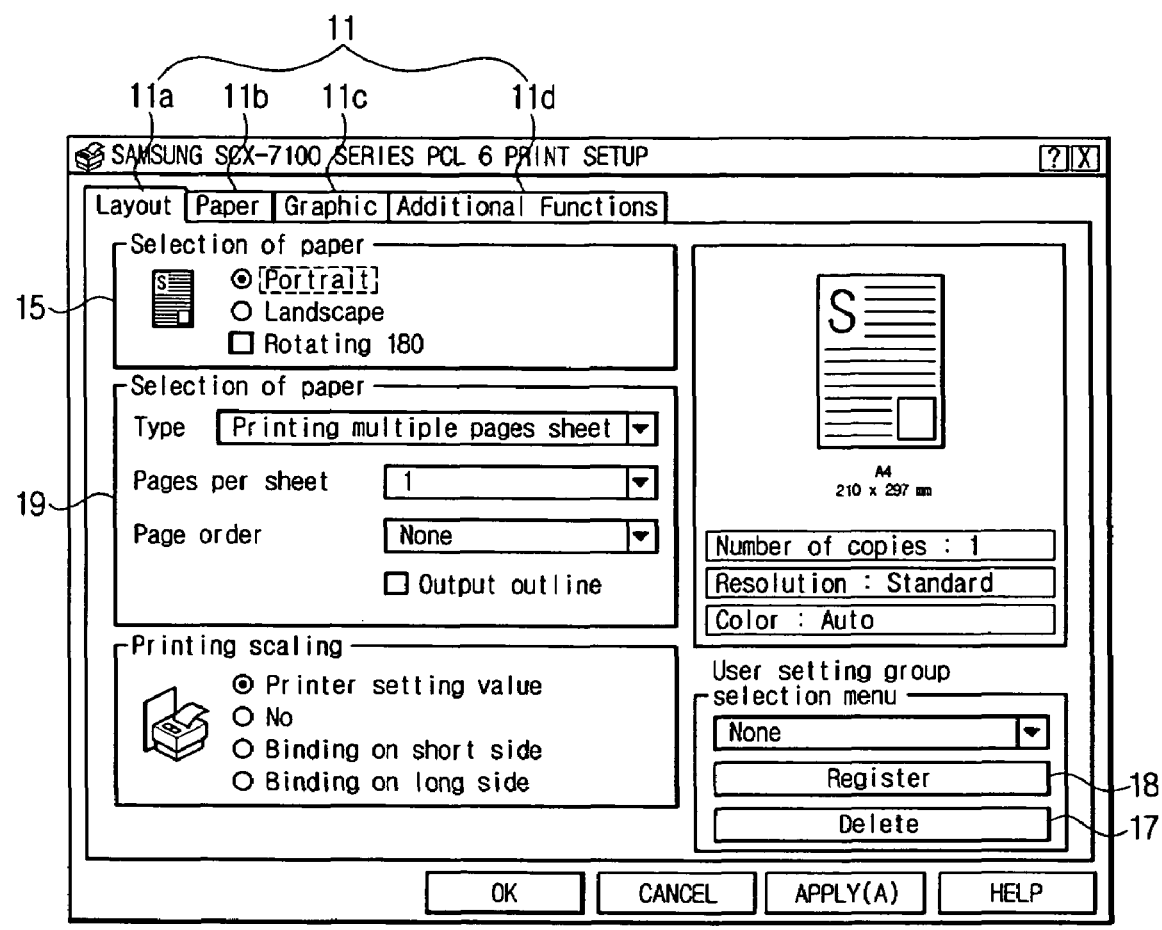

FIGS. 2A and 2B are views of user interfaces to illustrate a method of managing settings of properties of an image forming device according to an embodiment of the present general inventive concept.

As illustrated in FIG. 2A, a driver of the image forming device is installed on an operating system of a host computer connected to the image forming device to control and to drive the image forming device. When the driver is loaded, the user interface illustrated in FIG. 2A is displayed at a display part (e.g., LCD display, computer monitor screen, etc.) to set the properties of the image forming device. The user interface may include a plurality of menu tabs 11 including a layout tab 11a, a paper tab 11b, a graphic tab 11c, and an additional functions tab 11d. If the paper tab 11b is selected, a paper size selection menu 12 is displayed to select a desired paper size to be used in the image forming device. A user can select the desired paper size to be A4, LETTER, or LEGAL by using the paper size selection menu 12. Other paper sizes may also be used with the present general inventive concept. Additionally, the user interface of FIG. 2A includes a tray selection menu 13 to select a paper source of the image forming device and a printing scaling selection menu 14 to select a printing scaling of the image forming device.

Furthermore, the user interface of FIG. 2A includes a user setting group selection menu 16 to create a user setting group by setting desired printing preferences and/or to select the existing one of registered user setting groups stored by the driver. The user setting group selection menu 16 further includes a search button 16a to load desired printing preferences included in one of the registered user setting groups by selecting an existing one of the registered user setting groups stored by the driver. The user setting group includes a set of desired printing preferences and is created by selecting desired printing preferences using menu tabs 11a to 11b provided in the user interface of the driver. The created user setting group with selected desired printing preferences can be registered using the user setting group selection menu 16.

FIG. 2B illustrates the user interface corresponding to the layout tab 11a, which is displayed when the user selects the layout tab 11a from among the plurality of menu tabs 11. The user interface corresponding to the layout tab 11a includes an orientation selection menu 15 to set a paper orientation, which may include a portrait or a landscape, and a layout selection menu 19 to select a paper layout including a number of pages per sheet of paper and a printing order. Other paper orientations and paper layouts may also be used with the present general inventive concept. The selection of printing preferences provided from the layout tab 11a may be saved by selecting a registering button 18. There may be various selection menus to select additional printing preferences of the image forming device. The present general inventive concept provides a method of preventing printing preferences of existing (i.e., previously registered) user setting groups from being duplicated when a new user setting group is created by selecting desired printing preferences.

Figure 3:
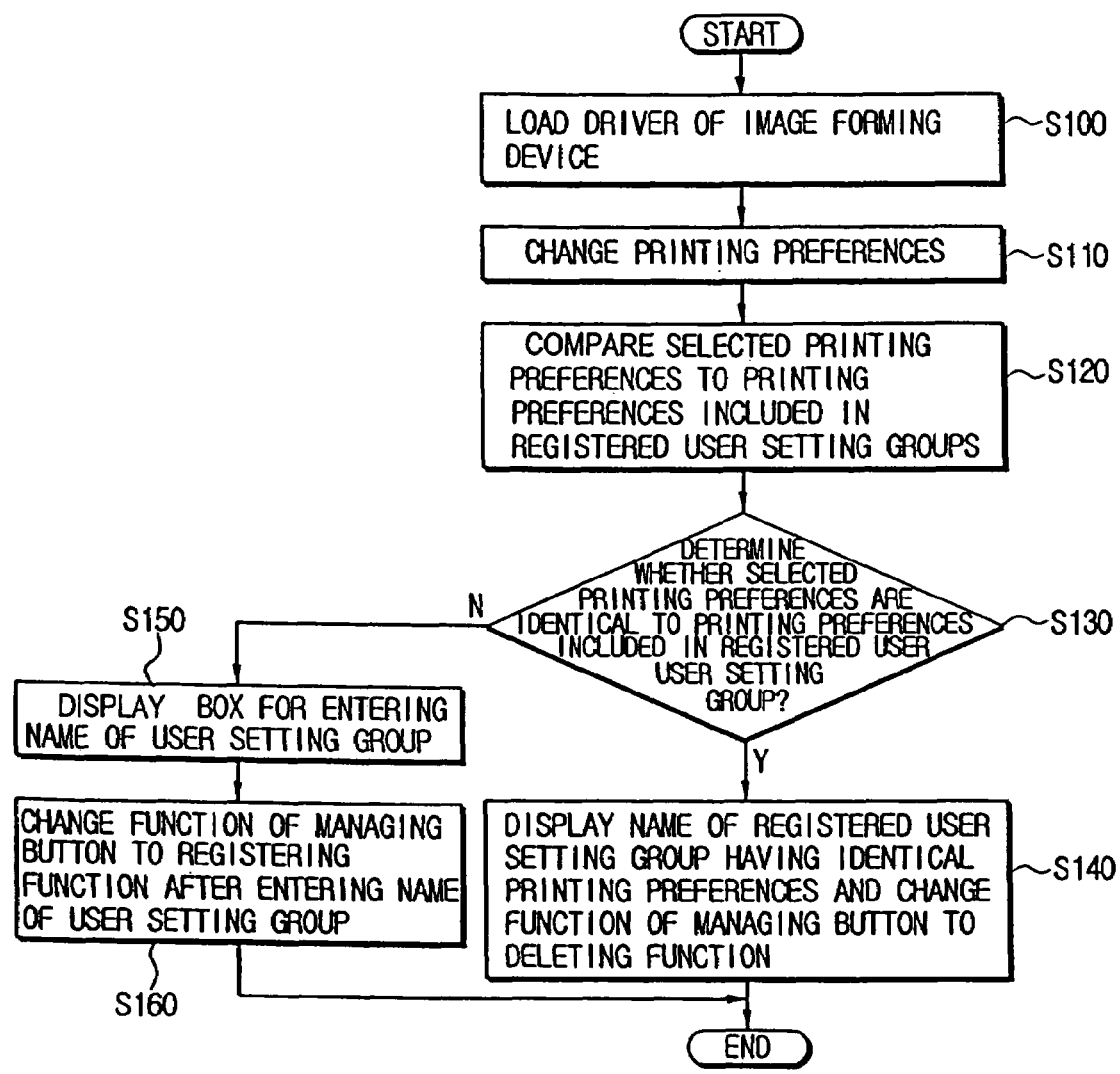
FIG. 3 is a flowchart illustrating the method of managing settings of properties of the image forming device described with reference to the user interfaces of FIGS. 2A and 2B.

FIG. 3 is a flowchart illustrating the method of managing settings of properties of the image forming device described with reference to the user interfaces of FIGS. 2A and 2B.

At operation S100, the user loads the driver of the image forming device. The driver is installed on the host computer connected to the image forming device. The driver controls and drives the image forming device.

At operation S110, the user changes printing preferences using the user interface provided by the driver. For example, the user may select the paper layout, the paper size, and/or the paper source. The registering button 18 and a deletion button 17 (i.e., a managing button(s)) are deactivated while the user is changing the printing preferences. Once one of the printing preferences is changed, a dialog box (not shown) is instantly displayed to enable entry of a name of a user setting group including the changed printing preference to create the user setting group. The displayed dialog box may include a text box to display text entered by the user and buttons to select or to cancel the entered text.

At operation S120, the driver compares the printing preferences currently selected by the user with the printing preferences included in at least one of registered user setting groups created and registered by the user setting group selection menu 16. The comparing function may be included in the driver by a programmer. At operation S130, the driver determines whether the currently selected printing preferences are identical to printing preferences included in the registered user setting groups.

At operation S140, if one of the registered user setting groups has printing preferences that are identical to the currently selected printing preferences, a name of the one of the registered user setting groups is displayed. Accordingly, the user does not create a duplicated user setting group having identical printing preferences. In the operation S140, the registering button 18 is deactivated and the deletion button 17 is activated. That is, the user may not create an unwanted user setting group and can delete an unnecessary user setting group, which is previously registered. In user interfaces of conventional drivers, "unregistered" is displayed at the user setting group selection menu 16 and the registering button 18 is activated when the user changes any of the printing preferences. As a result, the user must create an additional user setting group even though the user selects printing preferences that are identical to an existing registered user setting group. Using the present general inventive concept, the above mentioned drawback of conventional method is prevented.

At operation S150, if there is no registered user setting group having identical printing preferences to the currently selected printing preferences, the driver displays a dialog box to receive a name of a new user setting group having the currently selected printing preferences on a display part connected to the host computer. The dialog box may include a text input window (not shown) to enable entry of the name of the new user setting group via a keyboard, a mouse, or other input device, and a confirmation button and/or a canceling button to confirm or to cancel the name of the new user setting group, which is entered in the text input window.

At operation S160, when the user enters the name of the new user setting group in the dialog box and selects the confirmation button, the driver activates the registering button 18 to store the created new user setting group with the currently selected printing preferences. During the operation S160, the deletion button 17 is deactivated. As mentioned above, the registering button 18 is activated when there is no registered user setting group having identical printing preferences to the currently selected printing preferences. As a result, the user is prevented from creating a duplicate user setting group. The deletion button 17 is activated after creating the new user setting group with the currently selected printing preferences. The registering button 18 and the deletion button 17 may be arranged to be close to each other for the user's convenience.

The deletion button 17 and the registering button 18 may be separately provided. Alternatively, the deletion button 17 and the registering button 18 can also be provided by a single button. In this case, a function of the single button is changed according to a state of deleting or registering in the user setting group selection menu 16. A display of the single button may also be changed to reflect a current function (e.g., from deletion to registering or from registering to deletion) according to a state of the user setting group selection menu 16.

As mentioned above, the present general inventive concept compares the changed printing preferences to previously set printing preferences of registered user setting groups. Therefore, the present general inventive concept does not create a duplicated user setting group when there is a registered user setting group having identical printing preferences to the changed printing preferences. Also, the present general inventive concept prevents the user from creating the duplicated user setting group with identical printing preferences by selectively activating the registering button and the deletion button according to a result of the comparison.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of managing one or more print option setting groups of an image forming apparatus, the method comprising:
  inputting a selection of one or more print options of the image forming apparatus;
  comparing the selection of the one or more print options with one or more pre-stored print option setting groups to determine whether the selection of the one or more print options matches any of the one or more pre-stored print option setting groups; and
  if the selection of the one or more print options matches at least one of the pre-stored print option setting groups, preventing a new print option setting group with the selection of the one or more print options from being created and stored.

2. The method of claim 1, further comprising:
  if the selection of the one or more print options does not match the at least one of the pre-stored print option setting groups, enabling a new print option setting group with the selection of the one or more print options to be created and stored.

3. The method of claim 2, further comprising:
  pre-storing the one or more pre-stored print option setting groups each associated with a setting group identifier.

4. The method of claim 3, wherein if the selection of the one or more print options matches the at least one of the pre-stored print option setting groups, further displaying a setting group identifier of the matching at least one of the pre-stored print option setting groups.

5. The method of claim 1, wherein if the selection of the one or more print options does not match the at least one of the pre-stored print option setting groups, displaying a text box to receive a setting group identifier to be associated with the new print option setting group.

6. The method of claim 1, wherein the selection of the one or more print options includes at least one of a paper layout, a paper orientation, a paper size, a paper source, and a paper printing scale.

7. The method of claim 1, wherein the selection of the one or more print options is made by a user to a user interface using an input device, and the user interface includes one or more menu tabs.

8. The method of claim 1, wherein the one or more pre-stored print option setting groups are registered by a user.

9. The method of claim 1, wherein the selection of the one or more print options matches the at least one of the pre-stored print option setting groups if all of the one or more print options are identical to all print options associated with the at least one of the pre-stored print option setting groups.

10. The method of claim 1, wherein the preventing of the new print option setting group with the selection of the one or more print options from being created and stored comprises deactivating a registering button so that a user is not able to register the new print option setting group.

11. The method of claim 10, wherein the preventing of the new print option setting group with the selection of the one or more print options from being created and stored further comprises activating a deleting button to enable a user to delete at least one of the pre-stored print option setting groups.

12. The method of claim of claim 1, wherein if the selection of the one or more print options does not match the at least one of the pre-stored print option setting groups, activating a registering button to enable a user to register the new print option setting group with the selection of the one or more print options and deactivating a deleting button.

* * * * *